(12) United States Patent
Shi et al.

(10) Patent No.: US 12,145,292 B2
(45) Date of Patent: Nov. 19, 2024

(54) MULTI-FIELD COMPOSITE-BASED ADDITIVE MANUFACTURING DEVICE AND MULTI-FIELD COMPOSITE-BASED ADDITIVE MANUFACTURING METHOD

(71) Applicant: HUAZHONG UNIVERSITY OF SCIENCE AND TECHNOLOGY, Hubei (CN)

(72) Inventors: Yusheng Shi, Hubei (CN); Rongzhen Liu, Hubei (CN); Gong Chen, Hubei (CN); Yu Yang, Hubei (CN); Jie Liu, Hubei (CN); Shifeng Wen, Hubei (CN); Jiamin Wu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 278 days.

(21) Appl. No.: 17/785,914

(22) PCT Filed: Nov. 26, 2020

(86) PCT No.: PCT/CN2020/131802
§ 371 (c)(1),
(2) Date: Jun. 16, 2022

(87) PCT Pub. No.: WO2021/121002
PCT Pub. Date: Jun. 24, 2021

(65) Prior Publication Data
US 2023/0027566 A1 Jan. 26, 2023

(30) Foreign Application Priority Data
Dec. 20, 2019 (CN) .......................... 201911330118.X

(51) Int. Cl.
*B33Y 10/00* (2015.01)
*B28B 1/00* (2006.01)
*B33Y 30/00* (2015.01)

(52) U.S. Cl.
CPC .............. *B28B 1/001* (2013.01); *B33Y 10/00* (2014.12); *B33Y 30/00* (2014.12)

(58) Field of Classification Search
CPC ......... B33Y 10/00; B33Y 40/00; B33Y 30/00; B28B 1/001; B22F 2999/00; B22F 10/20;
(Continued)

(56) References Cited

U.S. PATENT DOCUMENTS

2018/0133956 A1* 5/2018 Buller .................... B33Y 50/02
2019/0211072 A1 7/2019 Doyle

FOREIGN PATENT DOCUMENTS

CN 105522712 4/2016
CN 106830901 6/2017
(Continued)

OTHER PUBLICATIONS

Jan Wilkes et al., "Additive manufacturing of ZrO2—Al2O3 ceramic components by selective laser melting", Rapid Prototyping Journal, Jan. 2013, pp. 51-57.
(Continued)

Primary Examiner — Monica A Huson
(74) Attorney, Agent, or Firm — JCIPRNET

(57) ABSTRACT

The present invention belongs to the technical field related to additive manufacturing, and provides a multi-field composite-based additive manufacturing device and method. The device comprises a powder delivery adjustment module, a sound field control module, a microwave field/thermal field control module and a microprocessor. The powder delivery adjustment module, the sound field control module and the microwave field/thermal field control module are
(Continued)

---

Providing the multi-field composite-based additive manufacturing device as described above, adding raw material powder to the multi-field composite-based additive manufacturing device, and closing the forming cavity

↓

After sufficiently dispersing the raw material powder in the raw material dispersion chamber, controlling the ultrasonic transducer array by the microprocessor to emit ultrasonic waves to form a sound field, capturing a predetermined amount of raw material powder in the raw material dispersion chamber by the sound field, moving the captured raw material powder to the high-temperature area under the action of the sound field

↓

Melting the raw material powder into a melt under the action of microwaves emitted by the microwave generators, and next, moving the melt to a designated position in the low-temperature region under the action of the sound field and then solidifying the melt

↓

Repeating step (2) and step (3) until a part to be manufactured is manufactured respectively connected to the microprocessor; the powder delivery adjustment module comprises a raw material dispersion chamber, and the raw material dispersion chamber is provided within a forming cavity formed by a housing; the sound field control module is also provided within the forming cavity and is located below the raw material dispersion chamber; the microwave field/thermal field control module comprises a plurality of microwave generators provided in the forming cavity, the plurality of microwave generators are respectively located at two sides of a forming area.

17 Claims, 1 Drawing Sheet

(58) Field of Classification Search
CPC .. B22F 2003/1054; B22F 10/32; Y02P 10/25; C22C 29/06; B29C 64/10; B29C 64/20; B29C 64/255; B29C 64/264; B29C 64/307; B29C 64/343; B29C 64/393
See application file for complete search history.

(56) References Cited

FOREIGN PATENT DOCUMENTS

| | | |
|---|---|---|
| CN | 107249859 | 10/2017 |
| CN | 107953553 | 4/2018 |
| CN | 108312497 | 7/2018 |
| CN | 110919819 | 3/2020 |

OTHER PUBLICATIONS

"International Search Report (Form PCT/ISA/210) of PCT/CN2020/131802," mailed on Feb. 9, 2021, with English translation thereof, pp. 1-4.

* cited by examiner

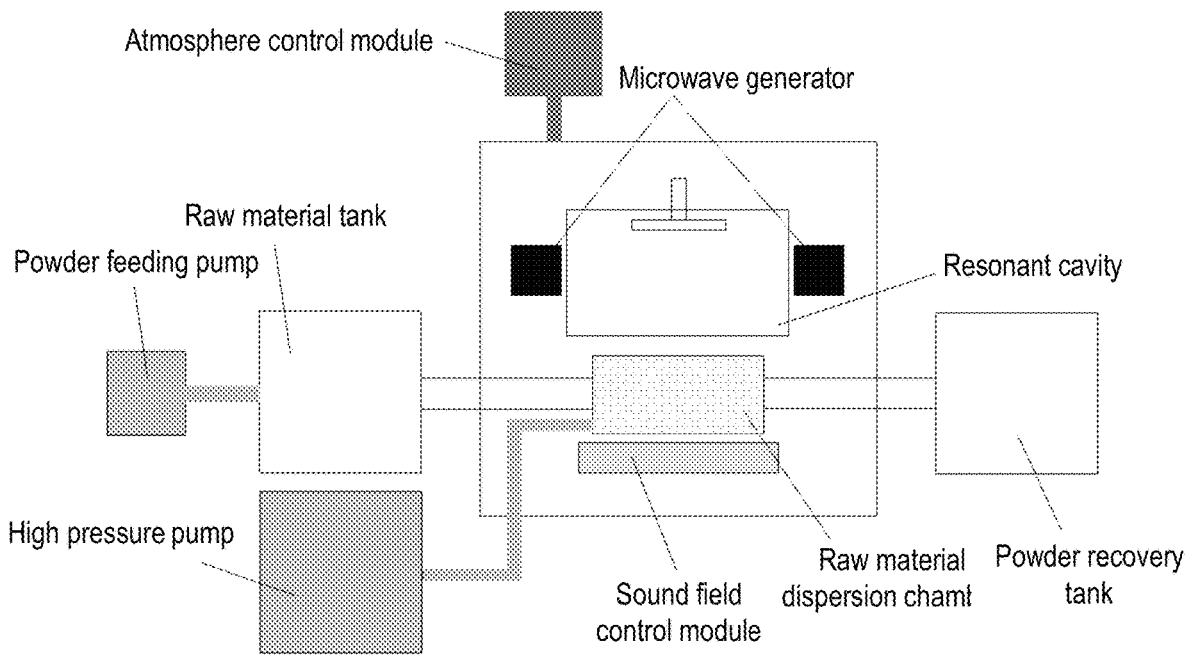

FIG. 1

> Providing the multi-field composite-based additive manufacturing device as described above, adding raw material powder to the multi-field composite-based additive manufacturing device, and closing the forming cavity > After sufficiently dispersing the raw material powder in the raw material dispersion chamber, controlling the ultrasonic transducer array by the microprocessor to emit ultrasonic waves to form a sound field, capturing a predetermined amount of raw material powder in the raw material dispersion chamber by the sound field, moving the captured raw material powder to the high-temperature area under the action of the sound field > Melting the raw material powder into a melt under the action of microwaves emitted by the microwave generators, and next, moving the melt to a designated position in the low-temperature region under the action of the sound field and then solidifying the melt > Repeating step (2) and step (3) until a part to be manufactured is manufactured

FIG. 2

MULTI-FIELD COMPOSITE-BASED ADDITIVE MANUFACTURING DEVICE AND MULTI-FIELD COMPOSITE-BASED ADDITIVE MANUFACTURING METHOD

CROSS-REFERENCE TO RELATED APPLICATION

This application is a 371 of international application of PCT application serial no. PCT/CN2020/131802, filed on Nov. 26, 2020, which claims the priority benefit of China application no. 201911330118.X, filed on Dec. 20, 2019. The entirety of each of the above mentioned patent applications is hereby incorporated by reference herein and made a part of this specification.

BACKGROUND

Technical Field

The disclosure belongs to the technical field related to additive manufacturing, and in particular, relates a multi-field composite-based additive manufacturing device and method.

Description of Related Art

Additive manufacturing technology is a new type of material shaping method. Compared with the conventional material removal-cutting processing technology, the additive manufacturing technology is a gradual accumulation and "bottom-up" manufacturing method. Compared with the conventional forming technology, the additive manufacturing technology has the following advantages: (1) parts with arbitrary complex shapes can be manufactured; (2) the manufacturing speed is fast and the manufacturing cycle is short without relying on molds. Since the 1990s, selected laser sintering (SLS), selective laser melting (SLM), stereolithography (SLA), laser cladding deposition (LENS), fused deposition modeling (FDM), etc. have been used in the formation of ceramic and cemented carbide parts. These additive manufacturing techniques can be roughly divided into the following two categories: the direct forming method and the indirect forming method. The process cycle of the direct forming method is short, and the finished product can be obtained without follow-up processing of the powder, so the production efficiency is much higher than that of the indirect forming method. In terms of product quality, the direct method has a greater potential for the manufacturing of parts because the direct method can achieve higher purity, density and mechanical properties. However, in the direct method, because the material is directly sintered or melted, a temperature gradient is easily generated during the forming process, the thermal crack is difficult to be well controlled, and the size and surface roughness of the workpiece are also limited. These disadvantages are characteristics that limit the direct method forming materials. Compared with the direct method, the biggest difference between the indirect method and the direct method is that it needs to use organic compound powder as a binder. In addition, in the indirect method, complex follow-up processing is required, the production cycle is long, and the production efficiency is low. However, relatively speaking, through the indirect method, the temperature of the forming process is lower, the temperature gradient is small, the crack generation can be reduced, and the size of the prepared product is much larger than that of the direct method.

At present, relevant researchers in this field have done some research. For instance, in the paper "Additive manufacturing of $ZrO_2$—$Al_2O_3$ ceramic components by selective laser melting" by Wikes et al., Germany, zirconia-alumina low temperature eutectic ceramic parts were prepared using the SLM method. In the forming process, in order to reduce the influence of thermal stress, the powder bed was preheated to 1800° C. before laser forming, and ceramic parts with a density close to 100% and a strength of 538 MPa are obtained. However, due to the high temperature preheating, the size of the molten pool expands during laser melting, and the surface quality and dimensional accuracy of the parts are poor. In another instance, patent CN106830901A discloses ceramic particles for laser sintering ceramic 3D printing and a preparation method. A ceramic powder, a binder, and a defoaming agent are mixed and granulated using a spray granulation method, processed into ceramic fine particles, and then sintered using a laser. The binder melts under the action of the laser to bind the particles together. This method still requires a follow-up degreasing process, and the overall forming efficiency is low. In general, at present, the following problems can still be found in additive manufacturing. 1. When the direct method is used for additive manufacturing, defects such as cracks and pores are difficult to control due to the existence of thermal gradients, and it is difficult to control the surface quality and dimensional accuracy. 2. The indirect method forming material requires additional pre-processing and post-processing steps, the forming efficiency is low, and impurities are easily introduced. Accordingly, there is an urgent need in the art for an additive manufacturing device and method that can reduce the number of defects such as material cracks and pores and reduce impurities in the material.

SUMMARY

In view of the above defects or improvement needs of the related art, the disclosure provides a multi-field composite-based additive manufacturing device and method through which a multi-field composite-based additive manufacturing device and method with improved surface accuracy are researched and designed based on the characteristics of the existing additive manufacturing. The additive manufacturing device uses ceramic powder for raw material to form parts with complex shapes, and the formed parts can meet the requirements for use. In addition, the use of the sound field to control the position of the raw material powder can precisely control the bonding position of the powder and the substrate or the formed part, and the surface accuracy may thus be improved.

To achieve the abovementioned objective, according to an aspect of the disclosure, a multi-field composite-based additive manufacturing device is provided. The additive manufacturing device includes a powder delivery adjustment module, a sound field control module, a microwave field/thermal field control module, and a microprocessor, and the powder delivery adjustment module, the sound field control module, and the microwave field/thermal field control module are connected to the microprocessor.

The powder delivery adjustment module includes a raw material dispersion chamber, and the raw material dispersion chamber is provided within a forming cavity formed by a housing. The sound field control module is also provided within the forming cavity and is located below the raw material dispersion chamber. The microwave field/thermal field control module includes a plurality of microwave generators provided in the forming cavity, the plurality of microwave generators are located at two sides of a forming area, and the microwave generators and the sound field control module are located at two opposite sides of the raw material dispersion chamber. The sound field control module includes an ultrasonic transducer array connected to the microprocessor. The forming area is divided into a high-temperature area and a low-temperature area, and a temperature of the high-temperature area is higher than that of the low-temperature area.

During operation, after raw material powder is sufficiently dispersed in the raw material dispersion chamber, the microprocessor controls the ultrasonic transducer array to emit ultrasonic waves to form a sound field, the sound field captures a predetermined amount of raw material powder in the raw material dispersion chamber, and the captured raw material powder moves to the high-temperature area under the action of the sound field and is melted into a melt under the action of microwaves emitted by the microwave generators. Next, the melt moves to a designated position in the low-temperature region under the action of the sound field and then solidifies.

Further, the microwave intensity of the high-temperature area is greater than the microwave intensity of the low-temperature area. The powder delivery adjustment module further includes a raw material tank, a powder feeding pump, a high pressure pump, and a powder recovery tank, and the powder feeding pump, the raw material tank, the raw material dispersion chamber, and the powder recovery tank are sequentially connected through a powder feeding pipeline. The high pressure pump is connected to the raw material dispersion chamber through the powder feeding pipeline.

Further, the powder feeding pump blows the raw material powder from the raw material tank into the raw material dispersion chamber under the control of the microprocessor. Next, the raw material dispersion chamber is closed, the powder in the raw material dispersion chamber is fully dispersed under the action of the high pressure pump, so as to facilitate a follow-up powder obtaining operation of the sound field, and after the powder obtaining operation of the sound field is completed, the powder in the raw material dispersion chamber is blown into the powder recovery tank.

Further, the additive manufacturing device also includes an atmosphere control module connected to the microprocessor. The atmosphere control module is arranged on the housing and includes an oxygen content detector, an air pressure detector, an air pump, a diffusion vacuum unit, and a pressure reducing valve arranged on the housing, and the diffusion vacuum unit is used to evacuate the forming cavity. The air pump is used for pumping protective gas into the forming cavity to prevent oxidation of a part during a forming process. The oxygen content detector and the air pressure detector are respectively used for detecting an oxygen content and an air pressure in the forming cavity and transmitting detected values to the microprocessor, and the microprocessor controls the action of the air pump and the pressure reducing valve accordingly according to the received data.

Further, the additive manufacturing device also includes a real-time monitoring module connected to the microprocessor. The real-time monitoring module includes a forming cavity temperature monitor and a powder position monitor. The forming cavity temperature monitor and the powder position monitor are arranged on the housing and are respectively used to monitor a real-time temperature in the forming cavity and a real-time position of the captured powder or melt, so as to control a shape of a part during forming.

Further, both the forming cavity temperature monitor and the powder position monitor are connected to the microprocessor, and the two transmit detected temperature and position data to the microprocessor. The microprocessor performs processing according to the received temperature and position data, so as to correspondingly control the sound field control module and the microwave field/thermal field control module.

Further, the additive manufacturing device also includes a power conditioner, and the power conditioner is connected to the microwave generator.

According to another aspect of the disclosure, a multi-field composite-based additive manufacturing method is also provided, and the additive manufacturing method includes the following steps.

(1) The multi-field composite-based additive manufacturing device as described above is provided, raw material powder is added to the multi-field composite-based additive manufacturing device, and the forming cavity is closed.

(2) After the raw material powder is sufficiently dispersed in the raw material dispersion chamber, the microprocessor controls the ultrasonic transducer array to emit ultrasonic waves to form a sound field, the sound field captures a predetermined amount of raw material powder in the raw material dispersion chamber, and the captured raw material powder moves to the high-temperature area under the action of the sound field.

(3) The raw material powder melts into a melt under the action of microwaves emitted by the microwave generators, and next, the melt moves to a designated position in the low-temperature region under the action of the sound field, and the melt then solidifies.

(4) Step (2) and step (3) are repeated until a part to be manufactured is manufactured.

Further, step (1) further includes the step of evacuating the forming cavity and introducing protective gas to the forming cavity.

Further, the protective gas is nitrogen or argon, and the microprocessor adjusts the microwave intensity of the forming area by controlling the plurality of the microwave generators.

In general, compared with the related art through the above technical solutions conceived by the disclosure, the multi-field composite-based additive manufacturing device and method provided by the disclosure mainly exhibit the following beneficial effects.

1. The sound field captures a predetermined amount of raw material powder in the raw material dispersion chamber, and the captured raw material powder moves to the high-temperature area under the action of the sound field and is melted into a melt under the action of the microwaves emitted by the microwave generators. Next, the melt moves to a designated position in the low-temperature region under the action of the sound field and then solidifies. The raw material powder or melt is transported by non-contact transport methods such as sound wave and air flow. Further, the powder is melted and sintered in a specific atmosphere with a gradient microwave field or thermal field (that is, the temperature of the forming area is distributed in a gradient) and is transported to a designated position by the transport adjustment module for solidification. In this way, the additive manufacturing of material components is achieved, which is suitable for the forming and preparation of various complex-shaped advanced ceramic components with well-defined melting points.

Moreover, the problems of cracking and performance degradation caused by differences in thermal field uniformity in direct additive manufacturing methods of the related art are avoided, and the surface quality is improved.

2. The use of the sound field to control the position of the raw material powder can precisely control the bonding position of the powder and the substrate or the formed part, and the surface accuracy may thus be improved. Further, when the sound field is used to control the powder, there is no direct contact with the powder, and it is not easy to cause pollution.

3. The use of the microwave sintering method for sintering can reduce the sintering temperature, increase the sintering speed, and facilitate high-efficiency rapid forming.

BRIEF DESCRIPTION OF THE DRAWINGS

FIG. 1 is a schematic view of a structure of a multi-field composite-based additive manufacturing device provided by the disclosure.

FIG. 2 is a schematic flow chart of a multi-field composite-based additive manufacturing method provided by the disclosure.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

With reference to FIG. 1 and FIG. 2, the disclosure provides a multi-field composite-based additive manufacturing device, and the additive manufacturing device includes a powder delivery adjustment module, a sound field control module, a microwave field/thermal field control module, an atmosphere control module, a real-time monitoring module, and a microprocessor. The powder delivery adjustment module, the sound field control module, the microwave field/thermal field control module, the atmosphere control module, and the real-time monitoring module are connected to the microprocessor.

The powder delivery adjustment module includes a raw material tank, a powder feeding pump, a powder feeding pipeline, a high pressure pump, a raw material dispersion chamber, and a powder recovery tank. The powder feeding pump, raw material tank, the raw material dispersion chamber, and the powder recovery tank are sequentially connected through the powder feeding pipeline. The high pressure pump is connected to the raw material dispersion chamber through the powder feeding pipeline. In this embodiment, the raw material dispersion chamber is located in a forming cavity formed by a housing, and the powder feeding pump, the high pressure pump, and the raw material dispersion chamber are controlled by the microprocessor.

The powder feeding pump blows a specific amount of powder from the raw material tank into the raw material dispersion chamber under the control of the microprocessor. Next, the raw material dispersion chamber is closed, the powder in the raw material dispersion chamber is fully dispersed under the action of the high pressure pump, so as to facilitate a follow-up powder obtaining operation of the ultrasonic-controlled sound field, and after the powder obtaining operation of the sound field is completed, the powder in the raw material dispersion chamber is blown into the powder recovery tank.

The sound field control module is provided below the raw material dispersion chamber and includes an ultrasonic transducer array, and the ultrasonic transducer array is connected to the microprocessor. After the powder is sufficiently dispersed in the raw material dispersion chamber, the microprocessor controls the ultrasonic transducer array to emit ultrasonic waves to form a sound field. The sound field captures a predetermined amount of raw material powder in the center of the raw material dispersion chamber, and the captured raw material powder moves to a forming area of the forming cavity under the action of the sound field and is melted into a melt under the action of microwaves. After the melt is moved to a designated position by sound waves, the corresponding microwave intensity decreases, the melt solidifies, and one forming process is completed.

The microwave field/thermal field control module is arranged in the forming cavity and includes a plurality of microwave generators. The microwave generators are connected to a power conditioner, and the microwave generators are connected to the microprocessor. In this embodiment, the microwave generators are located at two sides of the forming area, and the forming area and the sound field control module are located at two opposite sides of the raw material dispersion chamber. The forming area is further divided into a high-temperature area and a low-temperature area, and the powder forms a melt under the action of high-intensity microwaves after entering the forming area. Next, the melt moves to the designated position under the action of the sound field, the microwave intensity decreases, and the melt solidifies and forms.

The atmosphere control module is arranged on the housing and includes an oxygen content detector, an air pressure detector, an air pump, a diffusion vacuum unit, and a pressure reducing valve arranged on the housing, and the diffusion vacuum unit is used to evacuate the forming cavity. The air pump may be used for pumping protective gas into the forming cavity to prevent oxidation of a part during the forming process. The oxygen content detector and the air pressure detector are respectively used for detecting an oxygen content and an air pressure in the forming cavity and transmitting detected values to the microprocessor, and the microprocessor controls the action of the air pump and the pressure reducing valve accordingly according to the received data.

The real-time monitoring module includes a forming cavity temperature monitor and a powder position monitor. The forming cavity temperature monitor and the powder position monitor are arranged on the housing and are respectively used to monitor a real-time temperature in the forming cavity and a real-time position of the captured powder or melt, so as to control a shape of the part during forming. In this embodiment, both the forming cavity temperature monitor and the powder position monitor are connected to the microprocessor, and the two transmit the detected temperature and position data to the microprocessor. The microprocessor performs processing according to the received temperature and position data, so as to correspondingly control the sound field control module and the microwave field/thermal field control module.

The disclosure further provides a multi-field composite-based additive manufacturing method, and the additive manufacturing method mainly includes the following steps.

In step one, a multi-field composite-based additive manufacturing device as described above is provided. A sufficient amount of raw material powder is charged into the raw material tank, a substrate is mounted on a working platform, and then the forming cavity is sealed. The forming cavity is evacuated and a protective gas is introduced according to the work requirements.

In step two, part of the powder in the raw material tank is sent to the raw material dispersion chamber under the action of the powder feeding pump, and the raw material powder in the raw material dispersion chamber is uniformly dispersed under the action of the high pressure pump. After that, an ultrasonic transducer is used to capture a certain amount of raw material powder in the center of the raw material dispersion chamber. After the powder in the raw material dispersion chamber settles, the captured raw material powder is moved into the forming cavity. At this time, the powder in the raw material dispersion chamber is blown into the powder recovery tank by the air pump.

In step three, the microwave generator starts to work, so that the captured raw material powder is melted in the high-temperature area to be a molten state. The melt moves to the forming area located in the low-temperature area under the action of the sound field, the strength of microwave sintering is weakened, and the melt solidifies and combines with the substrate.

In step four, step two and step three are repeated until the part is manufactured.

In this embodiment, in step one, the protective gas finally introduced into the forming cavity is nitrogen or argon. In step three, the microwave intensity in different areas in the forming cavity may be adjusted so that the formed part may not melt.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A multi-field composite-based additive manufacturing device, wherein
the additive manufacturing device comprises a powder delivery adjustment module, a sound field control module, a microwave field/thermal field control module, and a microprocessor, the powder delivery adjustment module, the sound field control module, and the microwave field/thermal field control module are connected to the microprocessor,
the powder delivery adjustment module comprises a raw material dispersion chamber, the raw material dispersion chamber is provided within a forming cavity formed by a housing, the sound field control module is also provided within the forming cavity and is located below the raw material dispersion chamber, the microwave field/thermal field control module comprises a plurality of microwave generators provided in the forming cavity, the plurality of microwave generators are located at two sides of a forming area, the microwave generators and the sound field control module respectively surround an upper portion and a lower portion of the raw material dispersion chamber, and the sound field control module comprises an ultrasonic transducer array connected to the microprocessor, wherein the forming area is divided into a high-temperature area and a low-temperature area, a temperature of the high-temperature area is higher than that of the low-temperature area,
during operation, after raw material powder is sufficiently dispersed in the raw material dispersion chamber, the microprocessor controls the ultrasonic transducer array to emit ultrasonic waves to form a sound field, the sound field captures a predetermined amount of the raw material powder in the raw material dispersion chamber, the captured raw material powder moves to the high-temperature area under the action of the sound field and is melted into a melt under the action of microwaves emitted by the microwave generators, and next, the melt moves to a designated position in the low-temperature region under the action of the sound field and then solidifies,
wherein the microwave intensity of the high-temperature area is greater than the microwave intensity of the low-temperature area, the powder delivery adjustment module further comprises a raw material tank, a powder feeding pump, a high pressure pump, and a powder recovery tank, the powder feeding pump, the raw material tank, the raw material dispersion chamber, and the powder recovery tank are sequentially connected through a powder feeding pipeline, and the high pressure pump is connected to the raw material dispersion chamber through the powder feeding pipeline.

2. The multi-field composite-based additive manufacturing device according to claim 1, wherein the powder feeding pump blows the raw material powder from the raw material tank into the raw material dispersion chamber under the control of the microprocessor, next, the raw material dispersion chamber is closed, the powder in the raw material dispersion chamber is fully dispersed under the action of the high pressure pump, so as to facilitate a follow-up powder obtaining operation of the sound field, and after the powder obtaining operation of the sound field is completed, the powder in the raw material dispersion chamber is blown into the powder recovery tank.

3. The multi-field composite-based additive manufacturing device according to claim 1, wherein the additive manufacturing device further comprises an atmosphere control module connected to the microprocessor, the atmosphere control module is arranged on the housing and comprises an oxygen content detector, an air pressure detector, an air pump, a diffusion vacuum unit, and a pressure reducing valve arranged on the housing, the diffusion vacuum unit is used to evacuate the forming cavity, the air pump is used for pumping protective gas into the forming cavity to prevent oxidation of a part during a forming process, the oxygen content detector and the air pressure detector are respectively used for detecting an oxygen content and an air pressure in the forming cavity and transmitting detected values to the microprocessor, and the microprocessor controls the action of the air pump and the pressure reducing valve accordingly according to the received data.

4. The multi-field composite-based additive manufacturing device according to claim 1, wherein the additive manufacturing device further comprises a real-time monitoring module connected to the microprocessor, the real-time monitoring module comprises a forming cavity temperature monitor and a powder position monitor, and the forming cavity temperature monitor and the powder position monitor are arranged on the housing and are respectively used to monitor a real-time temperature in the forming cavity and a real-time position of the captured powder or melt, so as to control a shape of a part during forming.

5. The multi-field composite-based additive manufacturing device according to claim 4, wherein both the forming cavity temperature monitor and the powder position monitor are connected to the microprocessor, the forming cavity temperature monitor and the powder position monitor transmit detected temperature and position data to the microprocessor, and the microprocessor performs processing according to the received temperature and position data, so as to correspondingly control the sound field control module and the microwave field/thermal field control module.

6. The multi-field composite-based additive manufacturing device according to claim 1, wherein the additive manufacturing device further comprises a power conditioner, and the power conditioner is connected to the microwave generator.

7. A multi-field composite-based additive manufacturing method, wherein the method includes the following steps:
step (1) providing the multi-field composite-based additive manufacturing device according to claim 1, adding the raw material powder to the multi-field composite-based additive manufacturing device, and closing the forming cavity;
step (2) after sufficiently dispersing the raw material powder in the raw material dispersion chamber, controlling the ultrasonic transducer array by the microprocessor to emit ultrasonic waves to form the sound field, capturing a predetermined amount of the raw material powder in the raw material dispersion chamber by the sound field, moving the captured raw material powder to the high-temperature area under the action of the sound field;
step (3) melting the raw material powder into the melt under the action of microwaves emitted by the microwave generators, and next, moving the melt to a designated position in the low-temperature region under the action of the sound field and then solidifying the melt; and
step (4) repeating step (2) and step (3) until a part to be manufactured is manufactured.

8. The multi-field composite-based additive manufacturing method according to claim 7, wherein the step (1) further comprises a step of evacuating the forming cavity and introducing protective gas to the forming cavity.

9. The multi-field composite-based additive manufacturing method according to claim 8, wherein the protective gas is nitrogen or argon, and the microprocessor adjusts the microwave intensity of the forming area by controlling the plurality of the microwave generators.

10. The multi-field composite-based additive manufacturing device according to claim 2, wherein the additive manufacturing device further comprises a power conditioner, and the power conditioner is connected to the microwave generator.

11. The multi-field composite-based additive manufacturing device according to claim 3, wherein the additive manufacturing device further comprises a power conditioner, and the power conditioner is connected to the microwave generator.

12. The multi-field composite-based additive manufacturing device according to claim 4, wherein the additive manufacturing device further comprises a power conditioner, and the power conditioner is connected to the microwave generator.

13. The multi-field composite-based additive manufacturing device according to claim 5, wherein the additive manufacturing device further comprises a power conditioner, and the power conditioner is connected to the microwave generator.

14. A multi-field composite-based additive manufacturing method, wherein the method includes the following steps:
step (1) providing the multi-field composite-based additive manufacturing device according to claim 2, adding the raw material powder to the multi-field composite-based additive manufacturing device, and closing the forming cavity;
step (2) after sufficiently dispersing the raw material powder in the raw material dispersion chamber, controlling the ultrasonic transducer array by the microprocessor to emit ultrasonic waves to form the sound field, capturing a predetermined amount of the raw material powder in the raw material dispersion chamber by the sound field, moving the captured raw material powder to the high-temperature area under the action of the sound field;
step (3) melting the raw material powder into the melt under the action of microwaves emitted by the microwave generators, and next, moving the melt to a designated position in the low-temperature region under the action of the sound field and then solidifying the melt; and
step (4) repeating step (2) and step (3) until a part to be manufactured is manufactured.

15. A multi-field composite-based additive manufacturing method, wherein the method includes the following steps:
step (1) providing the multi-field composite-based additive manufacturing device according to claim 3, adding the raw material powder to the multi-field composite-based additive manufacturing device, and closing the forming cavity;
step (2) after sufficiently dispersing the raw material powder in the raw material dispersion chamber, controlling the ultrasonic transducer array by the microprocessor to emit ultrasonic waves to form the sound field, capturing a predetermined amount of the raw material powder in the raw material dispersion chamber by the sound field, moving the captured raw material powder to the high-temperature area under the action of the sound field;
step (3) melting the raw material powder into the melt under the action of microwaves emitted by the microwave generators, and next, moving the melt to a designated position in the low-temperature region under the action of the sound field and then solidifying the melt; and
step (4) repeating step (2) and step (3) until a part to be manufactured is manufactured.

16. A multi-field composite-based additive manufacturing method, wherein the method includes the following steps:
step (1) providing the multi-field composite-based additive manufacturing device according to claim 4, adding the raw material powder to the multi-field composite-based additive manufacturing device, and closing the forming cavity;
step (2) after sufficiently dispersing the raw material powder in the raw material dispersion chamber, controlling the ultrasonic transducer array by the microprocessor to emit ultrasonic waves to form the sound field, capturing a predetermined amount of the raw material powder in the raw material dispersion chamber by the sound field, moving the captured raw material powder to the high-temperature area under the action of the sound field;

step (3) melting the raw material powder into the melt under the action of microwaves emitted by the microwave generators, and next, moving the melt to a designated position in the low-temperature region under the action of the sound field and then solidifying the melt; and step (4) repeating step (2) and step (3) until a part to be manufactured is manufactured.

17. A multi-field composite-based additive manufacturing method, wherein the method includes the following steps:

step (1) providing the multi-field composite-based additive manufacturing device according to claim 5, adding the raw material powder to the multi-field composite-based additive manufacturing device, and closing the forming cavity;

step (2) after sufficiently dispersing the raw material powder in the raw material dispersion chamber, controlling the ultrasonic transducer array by the microprocessor to emit ultrasonic waves to form the sound field, capturing a predetermined amount of the raw material powder in the raw material dispersion chamber by the sound field, moving the captured raw material powder to the high-temperature area under the action of the sound field;

step (3) melting the raw material powder into the melt under the action of microwaves emitted by the microwave generators, and next, moving the melt to a designated position in the low-temperature region under the action of the sound field and then solidifying the melt; and step (4) repeating step (2) and step (3) until a part to be manufactured is manufactured.

* * * * *